United States Patent
Ogaki et al.

(10) Patent No.: US 10,680,235 B2
(45) Date of Patent: Jun. 9, 2020

(54) METHOD FOR PRODUCING ELECTRODE FOR LITHIUM-ION SECONDARY BATTERY

(71) Applicant: KANEKA CORPORATION, Osaka-shi (JP)

(72) Inventors: Fujika Ogaki, Settsu (JP); Masato Kuratsu, Settsu (JP); Ayumi Takaoka, Settsu (JP)

(73) Assignee: KANEKA CORPORATION, Osaka-shi (JP)

( * ) Notice: Subject to any disclaimer, the term of this patent is extended or adjusted under 35 U.S.C. 154(b) by 0 days.

(21) Appl. No.: 16/096,211

(22) PCT Filed: Apr. 17, 2017

(86) PCT No.: PCT/JP2017/015447
§ 371 (c)(1),
(2) Date: Oct. 24, 2018

(87) PCT Pub. No.: WO2017/188043
PCT Pub. Date: Nov. 2, 2017

(65) Prior Publication Data
US 2019/0140259 A1     May 9, 2019

(30) Foreign Application Priority Data

Apr. 27, 2016 (JP) .................................. 2016-089137

(51) Int. Cl.
*H01M 4/139* (2010.01)
*H01M 4/62* (2006.01)
(Continued)

(52) U.S. Cl.
CPC ......... *H01M 4/139* (2013.01); *H01M 4/0404* (2013.01); *H01M 4/624* (2013.01); *H01M 10/052* (2013.01); *H01M 10/0525* (2013.01)

(58) Field of Classification Search
CPC .... H01M 4/139; H01M 4/0404; H01M 4/624; H01M 10/052; H01M 10/0525
(Continued)

(56) References Cited

U.S. PATENT DOCUMENTS 6,447,951 B1 * 9/2002 Barker ................. H01M 4/136
429/218.1
9,083,056 B2 * 7/2015 Morishima ......... H01M 4/0404
(Continued)

FOREIGN PATENT DOCUMENTS

JP       11-144714      *  5/1999
JP       2007-234418 A     9/2007
(Continued)

OTHER PUBLICATIONS

International Search Report dated Aug. 1, 2017 in PCT/JP2017/015447 filed Apr. 17, 2017.
(Continued)

*Primary Examiner* — Brian K Talbot
(74) *Attorney, Agent, or Firm* — Oblon, McClelland, Maier & Neustadt, L.L.P.

(57) ABSTRACT

A method for producing a positive electrode containing a positive electrode active material and/or a negative electrode containing a negative electrode active material. The method includes a process for producing an electrode slurry including: a first process in which a positive or negative electrode active material, a conductive additive, and a nonaqueous solvent are mixed to obtain a slurry; and a second process in which the slurry is diluted or concentrated and then mixed to obtain the electrode slurry. In the first process, the mixing is performed such that the obtained slurry has a water content of 1000 ppm or less and a viscosity of 500 cP or more and 8000 cP or less, and, in the second process, the mixing is performed such that a water content of the
(Continued)

obtained electrode slurry is maintained at the water content of the slurry after the first process is completed.

15 Claims, 2 Drawing Sheets

(51) Int. Cl.
*H01M 10/052* (2010.01)
*H01M 4/04* (2006.01)
*H01M 10/0525* (2010.01)

(58) Field of Classification Search
USPC .................................................. 427/58, 115
See application file for complete search history.

(56) References Cited

U.S. PATENT DOCUMENTS

| | | | | |
|---|---|---|---|---|
| 9,257,696 | B2* | 2/2016 | Koh | H01M 4/0404 |
| 2005/0132562 | A1* | 6/2005 | Saito | H01M 4/0404 |
| | | | | 29/623.5 |
| 2007/0034841 | A1* | 2/2007 | Satou | H01G 4/008 |
| | | | | 252/512 |
| 2007/0231690 | A1* | 10/2007 | Fujita | H01M 4/131 |
| | | | | 429/209 |
| 2011/0171502 | A1* | 7/2011 | Kottenstette | H01M 4/131 |
| | | | | 429/49 |
| 2012/0107689 | A1* | 5/2012 | Takahashi | C09D 127/16 |
| | | | | 429/217 |
| 2012/0241667 | A1* | 9/2012 | Moriuchi | H01M 4/621 |
| | | | | 252/182.1 |
| 2015/0357648 | A1* | 12/2015 | Sugimoto | H01M 10/0525 |
| | | | | 429/217 |
| 2016/0118691 | A1* | 4/2016 | Goh | H01M 4/133 |
| | | | | 429/343 |

FOREIGN PATENT DOCUMENTS

| | | |
|---|---|---|
| JP | 2011-25183 A | 2/2011 |
| JP | 2012-043658 A | 3/2012 |
| JP | 2012-186054 A | 9/2012 |
| JP | 2014-192136 A | 10/2014 |

OTHER PUBLICATIONS

Office Action dated Mar. 10, 2020, in Japanese Patent Application No. 2018-514507.

* cited by examiner

METHOD FOR PRODUCING ELECTRODE FOR LITHIUM-ION SECONDARY BATTERY

TECHNICAL FIELD

The present invention relates to a method for producing an electrode for a lithium-ion secondary battery.

TECHNICAL BACKGROUND

In a nonaqueous, electrolyte secondary battery such as a lithium-ion secondary battery, battery performance capable of withstanding repeated charging and discharging for a long period of time is required. As one of attempts to ensure such battery performance, studies regarding a method for producing an electrode have been conducted.

For example, Patent Document 1 describes a method for producing a positive electrode, in which a positive electrode slurry is adjusted using a material of which a water content is specified, and the positive electrode slurry is used as a positive electrode material. With such a technology, a decrease in a battery capacity retention rate is suppressed.

RELATED ART

Patent Document

Patent Document 1: Japanese Patent Laid-Open Publication No. 2014-192136.

SUMMARY OF THE INVENTION

Problems to Be Solved by the Invention

However, even when the water content is specified as in the technology of Patent Document 1, since an active material is chemically damaged in a process in which the positive electrode slurry is produced, activity of a positive electrode active material is decreased, which leads to a decrease in an electric capacity retention rate. Therefore, there is room for improvement in the production process.

The present invention is intended to provide a method for producing an electrode for a lithium-ion secondary battery in which a decrease in a capacity retention rate is suppressed and which exhibits excellent cycle stability.

Means for Solving the Problems

The present invention is a method for producing a positive electrode that contains a positive electrode active material and a negative electrode that contains a negative electrode active material. The method includes a process for producing an electrode slurry for producing the positive electrode and the negative electrode. The process for producing the electrode slurry includes: a first process in which, at least, the positive electrode active material or the negative electrode active material, a conductive additive, and a nonaqueous solvent are mixed; and a second process in which the electrode slurry is produced by diluting or concentrating a slurry obtained in the first process and mixing the diluted or concentrated slurry. In the first process, the mixing is performed such that the obtained slurry has a water content of 1000 ppm or less and a viscosity of 500 cP or more and 8000 cP or less, and, in the second, process, the kneading is performed such that a water content of the obtained electrode slurry is maintained at the water content of the slurry after the first process is completed. In this way, it is found that a chemical damage to the active material in the electrode slurry is reduced, and, as a result, good battery characteristics are obtained.

Effect of Invention

According to the method for producing an electrode for lithium-ion secondary battery according to the present invention, a lithium-ion secondary battery having excellent cycle stability can be obtained.

MODE FOR CARRYING OUT THE INVENTION

Figure 1:
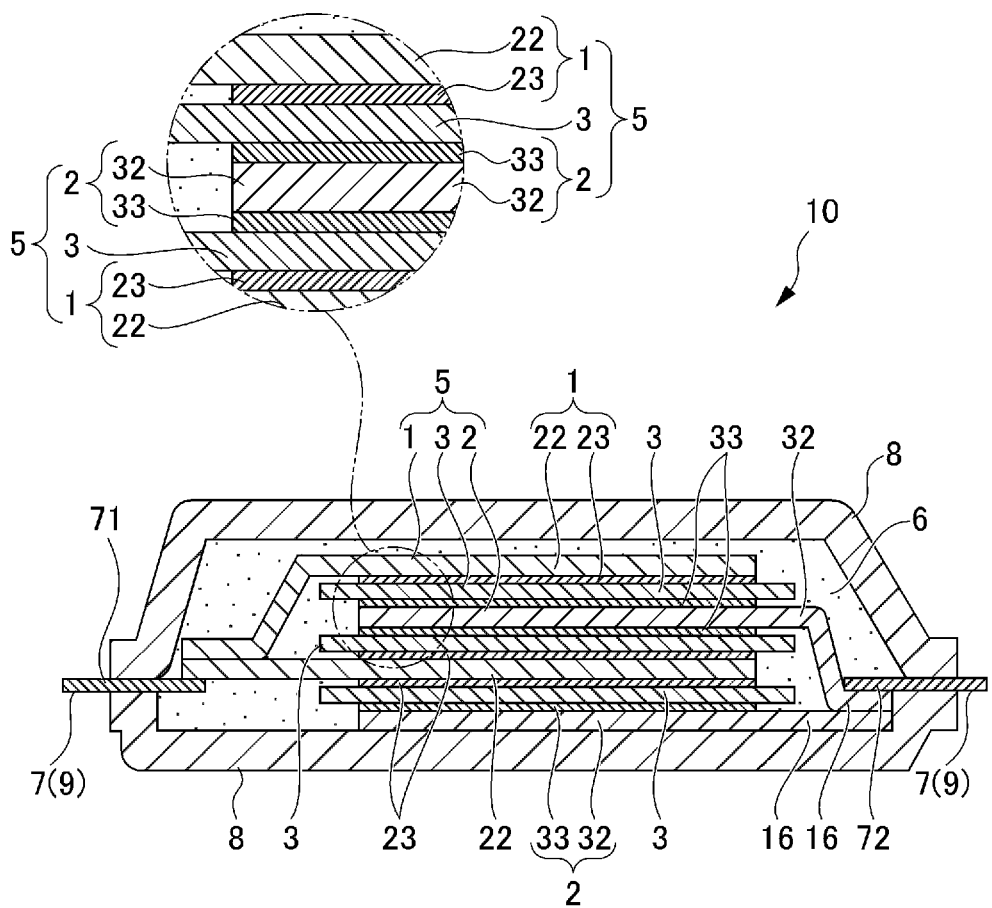
FIG. 1 is a cross-sectional view of a lithium-ion secondary battery.

A lithium-ion secondary battery according to the present invention is described using FIG. 1, which is an embodiment, for ease of understanding.

FIG. 1 is a cross-sectional view of a lithium-ion secondary battery. A lithium-ion secondary battery 10 is formed by enclosing a laminated body 5, a nonaqueous electrolyte 6, and terminals 7 in an inclusion body 8, the laminated body 5 including a positive electrode 1, a negative electrode 2, and a separator 3.

<Electrodes>

The electrodes (the positive electrode 1 and the negative electrode 2) have a function of performing insertion and extraction of lithium ions, that is, performing an electrode reaction, and, due to the electrode reaction, charging and discharging of the lithium-ion secondary battery are performed.

The electrodes each include an active material layer that contains an active material, and a current collector.

In the positive electrode 1, a positive electrode active material layer 23 is formed on one side or both sides of a positive electrode current collector 22. In the negative electrode 2, a negative electrode active material layer 33 is formed on one side or both sides of a negative electrode current collector 32.

The electrodes may be formed in a form, that is, a form of a bipolar type, in which the positive electrode active material layer 23 is formed on one side of a current collector, and the negative electrode active material layer 33 is formed on the other side of the current collector.

An active material is a substance that contributes to the electrode reaction.

As the positive electrode active material contained in the positive electrode 1, a lithium composite oxide such as a lithium manganese oxide (for example, $LiMnO_2$), a lithium nickel oxide (for example, $LiNiO_2$), a lithium cobalt oxide (for example, $LiCoO_2$), a lithium nickel cobalt oxide (for example, $LiNi_{1-y}Co_yO_2$), a lithium nickel manganese oxide (for example, $LiNi_xCo_yMn_{1-y-z}O_2$), a spinel type lithium manganese oxide (for example, $LiMn_2O_4$), or a lithium phosphorus oxide having an olivine structure (for example, $LiFePO_4$, $LiFe_{1-y}Mn_yPO_4$, $LiCoPO_4$, or the like) is suitably used, a lithium nickel oxide, a lithium nickel manganese oxide or a spinel type lithium manganese oxide is more preferable, and a lithium nickel manganese oxide is even more preferable. These positive electrode active materials may each be independently used, or two or more of these positive electrode active materials may be used in combination.

The negative electrode active material contained in the negative electrode 2 is not particularly limited as long as a standard potential of the negative electrode active material is lower than that of the positive electrode active material. As the negative electrode active material, a carbon material such as carbon or hard carbon, a metal such as tin (Sn) or a material containing a silicon oxide ($SiO_2$) in a metal, or a metal oxide such as a niobium pentoxide ($Nb_2O_5$), a titanic acid compound, a lithium titanate or a titanium dioxide is suitably used, a titanic acid compound, a titanium dioxide or a lithium titanate is more preferable, and a titanium dioxide or a lithium titanate is even more preferable. These negative electrode active materials may each be independently used, or two or more of these negative electrode active materials may be used in combination.

The titanic acid compound is preferably $H_2Ti_3O_7$, $H_2Ti_4O_9$, $H_2Ti_5O_{11}$, or $H_2Ti_6O_{13}$, $H_2Ti_{12}O_{25}$, and is more preferably $H_2Ti_{12}O_{25}$.

The titanium dioxide is preferably of an anatase type or a bronze type ($TiO_2$ (B)). From a point of view that lithium insertion and extraction efficiently proceeds, the titanium dioxide is more preferably of a bronze type. Further, a mixture of an anatase type titanium dioxide and a bronze type titanium dioxide may also be used.

The lithium titanate preferably has a spinel structure and is of a ramsdellite group, and is more preferably represented by $Li_4Ti_5O_{12}$ as a molecular formula. In the case of the spinel structure, expansion and contraction of an active material in an insertion and extraction reaction of lithium ions are small.

Particularly preferably, the titanium compound is $Li_4Ti_5O_{12}$, and, since a negative electrode having more excellent safety and stability can be provided, a lithium-ion secondary battery having excellent safety and stability can be obtained.

A bulk density of the active material is preferably 0.2 g/cm$^3$ or more and 2.2 g/cm$^3$ or less, and more preferably 0.2 g/cm$^3$ or more and 2.0 g/cm$^3$ or less.

The current collectors (22, 32) are member that respectively collect currents from the active material layers (23, 33).

For the current collectors (22, 32), any material can be suitably used as long as the material is a conductive material. The conductive material is preferably aluminum or an alloy of aluminum, and, from a point of view of being stable under a positive electrode reaction atmosphere, is more preferably high purity aluminum typified by JIS standards 1030, 1050, 1085, 1N90, 1N99, or the like.

Thicknesses of the current collectors (22, 32) are not particularly limited, but are each preferably 10 μm or more and 100 μm or less.

The electrodes may each further contain a conductive additive. The conductive additive is a conductive or semiconductive substance contained in the positive electrode active material and the negative electrode active material for a purpose of assisting conductivity of the electrodes.

As the conductive additive, a metal material or a carbon material is suitably used.

Examples of the metal material include copper, nickel, and the like.

Examples of the carbon material include natural graphite, artificial graphite, vapor grown carbon fiber, carbon nanotube, and carbon black such as acetylene black, ketchen black, and furnace black.

These conductive additives may each be independently used, or two or more of these conductive additives may be used in combination.

An amount of the conductive additive with respect to 100 parts by weight of the positive electrode active material or the negative electrode active material is preferably 1 part by weight or more and 30 parts by weight or less, and more preferably 2 parts by weight or more and 15 parts by weight or less. When the amount of the conductive additive is in such a range, the conductivity of the electrodes becomes better.

The electrodes may each further contain a binder. The binder is a material that enhances a binding property between the active material layers (23, 33) and the current collectors (22, 32).

When the binder is at least one selected from a group consisting of polyvinylidene fluoride (PVdF), polytetrafluoroethylene (PTFE), styrene-butadiene rubber, polyimide, and derivatives thereof, the binder can be suitably used.

An amount of the binder with respect to 100 parts by weight of the positive electrode active material or the negative electrode active material is preferably 1 part by weight or more and 30 parts by weight or less, and more preferably 2 parts by weight or more and 15 parts by weight or less. When the amount of the binder is in these ranges, the binding property between the active material layer and the current collector can be sufficiently obtained.

<Method for Producing Electrode>

As a method for producing an electrode, a method is suitable used in which an electrode slurry is prepared, and thereafter, the electrode slurry is carried on a current collector, and then, a nonaqueous solvent is removed, and an active material layer is formed on a current collector.

A material of the electrode slurry contains at least an active material and a nonaqueous solvent, and preferably further contains a binder, a conductive additive, a dispersing agent, a thickening agent, or the like.

The dispersing agent has a function of dispersing materials such as an active material in the slurry.

As the nonaqueous solvent, N-methyl-2-pyrrolidone (NMP), dimethylformamide, dimethylacetamide, methyl ethyl ketone, methyl acetate, ethyl acetate, or tetrahydrofuran is suitably used.

As a method for causing an electrode slurry to be carried on a current collector, a method of applying a slurry with a doctor blade, a die coater or a comma coater, a method of causing a slurry to adhere to a current collector by spraying, or a method of impregnating a current collector with a slurry can be suitably used. From a point of view of ease of a production method, the method of applying a slurry is preferable.

As a method of removing the nonaqueous solvent from the electrode slurry carried on the current collector, from a point of view that an operation is easy, drying using an oven or a vacuum oven is preferable.

As an atmosphere in which the solvent is removed, air, an inert gas, or a reduced pressure state is suitable. Further, examples of the atmosphere in which the solvent is removed include a vacuum state and the like.

A temperature at which the solvent is removed is not particularly limited as long as the solvent can be removed. From a point of view that the time required for the solvent removal is shortened, a lower limit of the temperature is preferably a room temperature or higher, more preferably 60° C. or higher, and even more preferably 80° C. or higher. Further, an upper limit of the temperature is preferably 300°

C. or lower, more preferably 250° C. or lower, and even more preferably 230° C. or lower.

<Method for Producing Electrode Slurry>

Figure 2:
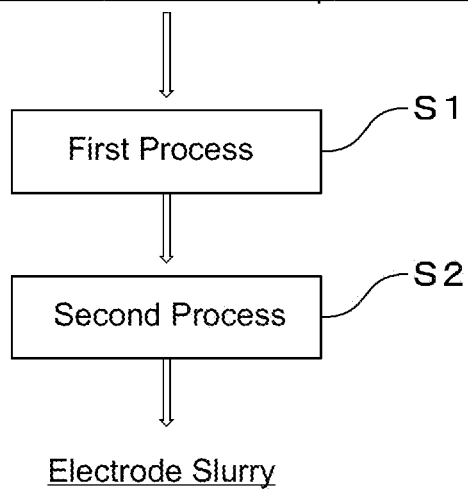
FIG. 2 is a flowchart illustrating production processes of an electrode slurry.

FIG. 2 is a flowchart illustrating production processes of the electrode slurry. As illustrated in FIG. 2, the electrode slurry can be produced using a method that includes: a first process (S1) in which a positive electrode active material or a negative electrode active material, a conductive additive, a nonaqueous solvent, and binder are mixed; and a second process (S2) in which an electrode slurry is produced by diluting or concentrating a slurry obtained in the first process (S1) and mixing the diluted or concentrated slurry.

In the first process (S1) and the second process (S2), when the electrode slurry materials are mixed, and kneaded, a spinning and revolving mixer, a ball mill, a planetary mixer, a jet mill, or a thin film spin type mixer is suitably used.

A viscosity of the slurry in the first process (S1) is 500 cP or more and 8000 cP or less, preferably 500 cP or more and 5000 cP or less from a point of view that the active material has a good dispersibility, more preferably 600 cP or more and 4000 cP or less from a point of view of having better processability, and even more preferably 1000 cP or more and 4000 cP or less.

When the viscosity of the slurry is 500 cP or more, a shearing force applied to the slurry to be mixed becomes stronger, and an effect is obtained that the materials of the slurry are uniformly mixed. On the other hand, when, the viscosity of the slurry is 8000 cP or less, cutting of a conductive path due to a shearing force applied to the slurry is suppressed. Therefore, as a result, current density distribution in the electrode is uniformized, and gas generation is less likely to occur, and, further, cycle stability is also improved.

By always mixing the slurry at the above-described viscosity, a chemical damage to the active material is suppressed. Therefore, it is thought that the battery will have excellent performance.

A water content of the slurry in the first process (S1) is 1000 ppm or less, preferably 500 ppm or less, and more preferably 350 ppm or less.

By always mixing the slurry at the above-described water content, a chemical damage to the active material is suppressed. Therefore, it is thought that the battery will have excellent performance. Further, by mixing the active material, the conductive additive and the binder, and the nonaqueous solvent in the first process (S1) under the above-described conditions of the water content and the viscosity, it is thought that the dispersibility of the materials can be improved and a uniform slurry can be obtained.

In the second process (S2), mixing is performed such that the water content of the obtained electrode slurry is maintained at the water content of the slurry after the first process (S1). Here, that "the water content of the obtained electrode slurry is maintained at the water content of the slurry after the first process (S1)" means that the water content of the obtained electrode slurry is within a range of ±5% around the water content of the slurry after the first process (S1).

In the second process (S2), by mixing the slurry, which is obtained in the first process (S1) and has a high dispersibility, while maintaining the water content, the dispersibility is further increased, and a chemical damage to the active material in the slurry is suppressed. Further, since mixing is performed while the water content is maintained, a preferred shearing force is applied to the slurry, a binding force of the binder is increased, and adhesion with the current collector is improved, and, as a result, a resistance value of the electrode decreases, and an electrode capable of providing excellent battery performance can be obtained.

As a method for diluting the slurry in the second process (S2), the same nonaqueous solvent as that contained in the slurry may be added, or, the slurry may also be diluted using other nonaqueous solvents.

As a method for concentrating the slurry in the second process (S2), heating or decompression is suitably used.

From a point of view that processability is good when an electrode is produced, the viscosity of the diluted or concentrated slurry is preferably 600 cP or more and 4000 cP or less, and more preferably 1000 cP or more 4000 cP or less.

The mixing time in the first process (S1) and the second process (S2) may be appropriately adjusted within a range in which, the active material is uniformly dispersed and is preferably 1 hour or more and 5 hours or less. When the mixing time is 1 hour or more, the materials in the slurry are sufficiently dispersed, and when the mixing time is 5 hours or less, gelation of the slurry that occurs over time and a chemical damage to the active material due to mixing are suppressed. In particular, the mixing time in the second process (S2) is preferably within the above-described range.

From a point of view that good electrode formation is performed, the solid content concentration of the slurry in the first prbcess (S1) and the second process (S2) is preferably 30 wt % or more and 80 wt % or less. In particular, the solid content concentration of the slurry obtained in the second process (S2) is preferably within the above-described range.

In the first process (S1) and the second process (S2), the slurry is preferably stirred under a reduced pressure or is heated and stirred under a reduced pressure. From a point of view of ease of implementation and from a point of view that a chemical damage to the active material is suitably small, stirring under a reduced pressure is more preferred.

An atmosphere for stirring under a reduced pressure is suitably used as long as at least water is evaporated. The atmosphere preferably has an absolute pressure of 31 kPa or less, and more preferably has an absolute pressure of 20 kPa or less.

In this way, the water content and the viscosity of the slurry are adjusted in two processes including the first process (S1) and the second process (S2). In the second process (S2), mixing is performed while suitable conditions are maintained. Thereby, more satisfactory dispersion uniformity of the materials can be obtained, and a chemical damage to the active material can be reduced. Further, since the conductive additive in the slurry is also uniformly dispersed, the resistance value of the electrode can be lowered. Further, since mixing is performed under the above-described conditions, a preferred shearing force is applied to the slurry, a binding force of the binder is increased, and adhesion with the current collector is improved, and, as a result, it is thought that an electrode capable of providing excellent battery performance can be obtained. In a case where the water content and the viscosity of the slurry are adjusted in one process, in particular, during mixing of the slurry, the state of the slurry changes under influence of the surrounding environment, for example, temperature and humidity. Further, since a solvent also contains water, when the solvent is added, the water content of the slurry naturally increases, and the viscosity also decreases. From these points, dispersibility and coatability to the current collector deteriorate. As a result, battery characteristics are adversely affected. Therefore, the two processes as in the present invention are important.

Here, as described above, the content of the conductive additive in the electrode slurry with respect to 100 parts by weight of the positive electrode active material or the negative electrode active material is preferably 1 part by weight or more and 30 parts by weight or less, and more preferably 2 parts by weight or more and 15 parts by weight or less. When the content of the conductive additive is in the above-described range, the dispersibility of the materials in the electrode slurry is good, and the conductivity of the electrode becomes better. When the content of conductive additive is too small, the resistance value of the electrode tends to increase. When the content of conductive additive is too large, the dispersibility of the active material deteriorates and the amount of the active material relatively decreases, and thus, a battery capacity tends to decrease.

<Separator>

The separator 3 is arranged between the positive electrode 2 and the negative electrode 1 and functions as a medium that mediates conduction of lithium ions between the positive electrode and the negative electrode while preventing conduction of electrons and holes between the positive electrode 2 and the negative electrode 1, and at least does not have electron or hole conductivity.

The separator 3 may contain various plasticizers, antioxidants, flame retardants, and may be coated with a metal oxide or the like.

A material of the separator 3 is formed of an electrically insulating material and has an electrical insulation property.

The material of the separator 3 is preferably a material having at least a specific resistance of $1 \times 10^8$ Ω·cm or more.

Examples of the material of the separator 3 include a woven fabric, a nonwoven fabric, a microporous membrane and the like formed of nylon, cellulose, polysulfone, polyethylene, polypropylene, polybutene, polyacrylonitrile, polyimide, polyamide, PET, and combinations of two or more thereof.

From a point of view of practicality, the material of the separator 3 is preferably one or more selected from a group consisting of a cellulose nonwoven fabric, polypropylene, polyethylene and PET, and more preferably polypropylene, polyethylene and a cellulose nonwoven fabric.

<Laminated Body>

The laminated body 5 is formed by alternately laminating or winding multiple positive electrodes 1, multiple negative electrodes 2 and multiple separators 3.

The number of laminated layers or the number of windings of the laminated body 5 may be appropriately adjusted according to a desired voltage value and a desired battery capacity.

<Nonaqueous Electrolyte>

The nonaqueous electrolyte 6 has a function of mediating ion transfer between the positive electrode 1 and the negative electrode 2, and can use an electrolyte prepared by dissolving a solute in a nonaqueous electrolyte, a gel electrolyte prepared by impregnating a polymer with an electrolyte, where the electrolyte is made by dissolving a solute in a nonaqueous solvent, or the like.

As the solute, lithium salts such as $LiClO_4$, $LiBF_4$, $LiPF_6$, $LiAsF_6$, $LiCF_3SO_3$, LiBOB (Lithium Bis (Oxalato) Borate), $LiN(SO_2CF_3)_2$ are preferable, and $LiPF_6$ is more preferable.

As the nonaqueous solvent, an aprotic solvent is preferred. From a point of view that solubility of the lithium salt is good, an aprotic polar solvent is more preferable.

As the aprotic polar solvent, there is a cyclic aprotic polar solvent or a chain aprotic polar solvent, and examples thereof include carbonate, ester, ether, phosphate ester, amide, sulfuric acid ester, sulfite ester, sulfone, sulfonic acid ester, nitrile and the like.

Examples of the cyclic aprotic polar solvent include cyclic carbonate, cyclic ester, cyclic sulfone and cyclic ether.

Examples of the cyclic carbonate include ethylene carbonate (EC), propylene carbonate (PC), fluoroethylene carbonate, butylene carbonate and the like.

Examples of the chain aprotic polar solvent include chain carbonate, chain carboxylic acid ester, chain ether, and the like.

Examples of the chain carbonate include dimethyl carbonate, diethyl carbonate, ethyl methyl carbonate (EMC), dipropyl carbonate, methyl propyl carbonate, and the like.

As the nonaqueous electrolyte solvent, it is preferable to use a solvent obtained by mixing two or more of these solvents, and, from a point of view that conductivity of lithium ions is good, a mixed solvent of a cyclic aprotic polar solvent and a chain aprotic polar solvent is particularly preferable. By doing so, solubility of the solute can be improved. Also, the conductivity of the lithium ions can be increased.

From a point of view of having a good balance between viscosity and solubility, a ratio of the chain aprotic polar solvent in the mixed solvent is preferably 5 vol % 95 vol %, more preferably 10 vol % 90 vol %, even more preferably 20 vol %-80 vol %, and most preferably 50 vol %-80 vol %.

Further, in addition to mixed solvents, common nonaqueous solvents such as acetonitrile may also be used.

Further, the nonaqueous electrolyte 6 of the present invention may contain a trace amount of additives such as a flame retardant and a stabilizer.

An amount of the nonaqueous electrolyte 6 per 1 Ah of the battery capacity is preferably 0.1 mL or more. When the amount of the nonaqueous electrolyte 6 is within this range, conduction of the lithium ions due to the electrode reaction can be sufficiently ensured, and desired battery performance can be developed.

<Terminals>

The terminals 7 are members that electrically connect the lithium-ion secondary battery 10 with an external device.

The terminals 7 are formed by connecting a positive-electrode forming member 15 and a positive-electrode terminal 71, or a negative-electrode forming member 16 and a negative-electrode terminal 72.

As the terminals, any material can be suitably used as long as the material is a conductor, and, from a point of view of having a good balance between performance and cost, aluminum is more preferable.

<Inclusion Body>

The inclusion body 8 has a function of protecting the laminated body 5 and the nonaqueous electrolyte 6 from moisture and air outside the lithium-ion secondary battery 10.

As the inclusion body 8, a composite film obtained by providing a thermoplastic resin layer for heat sealing on a metal foil, a metal layer formed by vapor deposition or sputtering, or a metal can of a square shape, an oval shape, a cylindrical shape, a coin shape, a button shape or a sheet shape, is suitably used, and the composite film is more preferable.

As the metal foil of the composite film, from a point of view of having a good balance between a moisture blocking property, a weight and a cost, an aluminum foil can be suitably used.

As the thermoplastic resin layer of the composite film, from a point of view that a heat-sealing temperature range and a blocking property of the nonaqueous electrolyte 6 are good, polyethylene or polypropylene is suitably used.

In the lithium-ion secondary battery 10, the terminals 7 each have at least a terminal extension part 9 extending to the outside of the inclusion body 8.

EXAMPLES

In the following, the present invention is more specifically described based on Examples. However, the present invention is not limited by these Examples.

For viscosity measurement of a slurry, an E type viscometer (TV-22 type viscometer cone plate type: Toki Sangyo Co., Ltd.) was used. A shape of a rotor was 3°×R24, and a rotation speed was 60 rpm, and a viscosity at the time when the rotor was operated for 1 minute was measured.

A water content of the slurry was measured using a Karl Fischer moisture meter (MCK-610: Kyoto Electronics. Industry Co., Ltd.).

A resistance value of an electrode plate was measured by a 4-terminal method using an LCR meter 3522-50 manufactured by HIOKI. In this case, alligator clip type terminals were used as measurement terminals and the measurement was performed in a state in which the terminals were fixed at an inter-terminal distance of 0.5 cm.

Abbreviated substance names are as follows.
PVdF: Polyvinylidene fluoride
NMP: N-methylpyrrolidone
EC: Ethylene carbonate
DMC: dimethyl carbonate

Example 1

(Preparation of Positive Electrode)
First Process

First, with respect to 100 parts by weight of $LiNi_{1/2}Mn_{3/2}O_4$, 7 parts by weight of acetylene black, 4.5 parts by weight of PVdF, and 105 parts by weight of NMP were added to a planetary mixer. Thereafter, the mixture was stirred at a normal temperature while a pressure inside the planetary mixer was reduced to an absolute pressure of 20 kPa or less, and a first slurry was obtained. The first slurry was set to have a water content of 300 ppm and a viscosity of 4000 cP.

Second Process

The first slurry was diluted with NMP, and a slurry of which a solid content concentration was adjusted to 44% was stirred with a planetary mixer while a pressure was reduced to an absolute pressure of 20 kPa or less, and a second slurry was obtained. The second slurry was set to have a water content of 300 ppm and a viscosity of 2000 cP. Through the above processes, a positive electrode slurry was obtained.

Next, the positive electrode slurry was applied on an aluminum foil having a thickness of 15 μm using a comma coater. Thereafter, the NMP of the slurry was removed by heat drying at 120° C. and vacuum drying at 150° C., and a positive electrode was obtained.

(Preparation of Negative Electrode)
First Process

First, with respect to 100 parts by weight of lithium titanate, 4.4 parts by weight of acetylene black, 4.4 parts by weight of PVdF and 53.5 parts by weight of NMP were added to the planetary mixer. Thereafter, the mixture was stirred at a normal temperature while a pressure inside the planetary mixer was reduced to an absolute pressure of 20 kPa or less, and a first slurry was obtained. The first slurry was set to have a water content of 400 ppm and a viscosity of 3000 cP.

Second Process

The first slurry was diluted with NMP, and a slurry of which a solid content concentration was adjusted to 44% was stirred with a planetary mixer while a pressure was reduced to an absolute pressure of 20 kPa or less, and a second slurry was obtained. The second slurry was set to have a water content of 350 ppm and a viscosity of 1000 cP. Through the above processes, a negative electrode slurry was obtained.

Next, the negative electrode slurry was applied on an aluminum foil having a thickness of 15 μm using a comma coater. Thereafter, the NMP of the slurry was removed by heat drying at 120° C. and vacuum drying at 150° C., and a negative electrode was obtained.

(Preparation of Battery)

First, 13 sheets of positive electrodes each punched into an area of 24 $cm^2$, 14 sheets of negative electrodes each punched into an area of 27 $cm^2$ were alternately laminated via a cellulose nonwoven fabric separator having a thickness of 25 μm and an area of 30 $cm^2$, and a laminated body was obtained.

Next, an aluminum terminal was attached to each of the positive electrode and the negative electrode. Thereafter, an electrode group including the terminals was sandwiched between two aluminum laminate sheets. In this case, the terminals partially extended to an outer side of the aluminum laminate sheets.

Thereafter, the two aluminum laminate sheets were thermally welded to each other and were formed into a shape of a bag. In this case, a space for accommodating the electrode group, a space for injecting the nonaqueous electrolyte, and a gas pocket for storing a gas generated in the battery were prepared.

Thereafter, a nonaqueous electrolyte having a concentration of 1 mol/L, which was prepared by adding $LiPF_6$ as a solute to a nonaqueous solvent prepared by mixing EC and DMC at a volume ratio of 3:7, was added to the bag. Thereafter, a space was created while a pressure inside the bag was reduced, and an inclusion body sealing the electrode group and the nonaqueous electrolyte was prepared.

Then, the inclusion body was cured for 12 hours, and a lithium-ion secondary battery was prepared.

Example 2

In preparing a positive electrode, a first slurry was set to have a water content of 200 ppm and a viscosity of 5000 cP, and a second slurry was adjusted to have a solid content concentration of 44% and was set to have a water content of 200 ppm and a viscosity of 2500 cP. Other than these, through the same processes as Example 1, a lithium-ion secondary battery was prepared.

Example 3

$LiNi_{1/2}Mn_{1/2}O_2$ was used instead of $LiNi_{1/2}Mn_{3/2}O_4$ as a positive electrode material. Further, in preparing a positive electrode, a first slurry was set to have a water content of 300 ppm and a viscosity of 4500 cP, and a second slurry was adjusted to have a solid content concentration of 44% and was set to have a water content of 300 ppm and a viscosity of 1500 cP. Other than these, through the same processes as Example 1, a lithium-ion secondary battery was prepared.

Comparative Example 1

In preparing a positive electrode, a first slurry was set to have a water content of 300 ppm and a viscosity of 12000 cP, and a second slurry was adjusted to have a solid content concentration of 44%, and was set to have a water content of 250 ppm and a viscosity of 3500 cP. Other than these, through the same processes as Example 1, a lithium-ion secondary battery was obtained.

Comparative Example 2

In preparing a positive electrode, a slurry was stirred without reducing a pressure inside a planetary mixer, and a first slurry has a water content of 2000 ppm and a viscosity of 4000 cP. A second slurry was set to have a water content of 900 ppm and a viscosity of 2000 cP. Other than these, through the same processes as Example 1, a lithium-ion secondary battery was prepared.

Comparative Example 3

In preparing a positive electrode, a first slurry was set to have a water content of 900 ppm and a viscosity of 8000 cP. A slurry was stirred without reducing a pressure inside a planetary mixer, and a second slurry was set to have a water content of 1200 ppm and a viscosity of 3000 cP. Other than these, through the same processes as Example 1, a lithium-ion secondary battery was prepared.

Comparative Example 4

In preparing a positive electrode, with respect to 100 parts by weight of $LiNi_{1/2}Mn_{3/2}O_4$, 0.5 parts by weight of acetylene black, 4.5 parts by weight of PVdF, and 45 parts by weight of NMP were added to a planetary mixer. Thereafter, the mixture was stirred at a normal temperature while a pressure inside the planetary mixer was reduced to an absolute pressure of 20 kPa or less, and a first slurry was obtained. The first slurry was set to have a water content of 300 ppm and a viscosity of 9000 cP.

Thereafter, the first slurry was diluted with NMP, and a slurry of which a solid content concentration was adjusted to 44% was stirred with a planetary mixer whilet pressure was reduced to an absolute pressure of 20 kPa or less, and a second slurry was prepared. The second slurry was set to have a water content of 2000 ppm and a viscosity of 300 cP. Through the above processes, a positive electrode slurry was obtained. Other than these, through the same processes as Example 1, a lithium-ion secondary battery was prepared.

Comparative Example 5

In preparing a positive electrode, with respect to 100 parts by weight of $LiNi_{1/2}Mn_{3/2}O_4$, 32 parts by weight of acetylene black, 15 parts by weight of PVdF, and 160 parts by weight of NMP were added to a planetary mixer. Thereafter, the mixture was stirred at a normal temperature while a pressure inside the planetary mixer was reduced to an absolute pressure of 20 kPa or less, and a first slurry was obtained. The first slurry was set to have a water content of 800 ppm and a viscosity of 10000 cP.

Thereafter, the first slurry was diluted with NMP, and a slurry of which a solid content concentration was adjusted to 38% was stirred with a planetary mixer while a pressure was reduced to an absolute pressure of 20 kPa or less, and a second slurry was prepared. The second slurry was set to have a water content of 7000 ppm and a viscosity of 600 cP. Through the above processes, a positive electrode slurry was prepared. Other than these, through the same processes as Example 1, a lithium-ion secondary battery was prepared.

Comparative Example 6

In preparing a positive electrode, first, with respect to 100 parts by weight of $LiNi_{1/2}Mn_{3/2}O_4$, 90 parts by weight of acetylene black, 6 parts by weight of PVdF, and 4 parts by weight of NMP were added to a planetary mixer. Thereafter, the mixture was stirred at a normal temperature while a pressure inside the planetary mixer was reduced to an absolute pressure of 20 kPa or less, and a solid content concentration was adjusted to 44%. A slurry in this case was set to have a water content of 400 ppm and a viscosity of 2000 cP. Other than these, through the same processes as Example 1, a lithium-ion secondary battery was prepared.

(Performance Evaluation)

With respect to the lithium-ion secondary batteries prepared in Examples, aging tests and gas generation amount measurements, or charging and discharging cycle tests were performed, and performance was evaluated.

(Aging Test)

The aging test was performed using one of two conditions.

Aging Condition 1:

First, a secondary battery is charged to 3.4 V and an SOC (state of charge) of 100% with a constant current of 0.2 C. Then, the lithium-ion secondary battery is stored for 1 week in an oven at 60° C.

Aging Condition 2:

First, a secondary battery is charged to 3.0 V and an SOC (state of charge) of 100% with a constant current of 0.2 C. Then, the lithium-ion secondary battery is stored for 1 week in an oven at 60° C.

(Gas Generation Amount Measurement)

A difference in volume of a battery before and after aging was measured using an Archimedes method, and was used as a gas generation amount.

(Method of Charging and Discharging Cycle Test)

In a charging and discharging cycle test, charging and discharging cycles were repeated under Charging Condition 1 and Discharging Condition 1 or under Charging Condition 2 and Discharging condition 2. Voltages described below are not based on lithium metal standard but are voltages of the lithium-ion secondary battery.

Cycle Conditions

Battery environmental temperature: 45° C.

Unit cycle: Charging one time and discharging one time are defined as one cycle.

Number of cycles: 400 cycles

Charging and Discharging Condition 1

Charging Condition 1: Charging is performed with a constant current of 1.0 C until a voltage reaches 3.4 V, and then the charging is terminated at 3.4 V.

Discharging condition 1: Discharging is performed at a constant current of 1.0 C until the voltage is reduced to 2.5 V, and, when a voltage of 2.5 V is reached, the discharging is terminated.

Charging and Discharging Condition 2

Charging condition 2: Charging is performed with a constant current of 0.5 C until a voltage of 3.0 V is reached. Thereafter, charging is performed at a constant voltage by maintaining the voltage at 3.0 V. Thereafter, when the current reaches 0.02 C, charging is terminated.

Discharging condition 2: Discharging is performed at a constant current of 1.0 C until the voltage is reduced to 2.0 V, and, when a voltage of 2.0 V is reached, the discharging is terminated.

Here, the term "C" is defined as a value of a current required to charge or discharge a total capacity of a lithium-ion secondary battery in 1 hour. For example, 0.5 C represents a value of a current required to charge or discharge a total capacity of a lithium-ion secondary battery in 2 hours.

Then, a ratio (percentage value) calculated using a discharge capacity after 1 cycle in a charging and discharging cycle test as a denominator and a discharge capacity after 400 cycles as a numerator was taken as a capacity retention rate.

(Evaluation Criteria of Batteries)

As a criterion for evaluating, the prepared batteries, a case where a capacity retention rate after a charging and discharging cycle test was 90% or more and a gas generation amount was 20 cc or less was regarded as acceptable.

TABLE 1

| | Positive Electrode Slurry | | | | Positive Electrode Resistance Value (Ω) | Charging and Discharging Cycle Test | | Aging Test | |
|---|---|---|---|---|---|---|---|---|---|
| | First Slurry | | Second Slurry | | | Capacity | | Gas | |
| Level | Viscosity (cP) | Water Content (ppm) | Viscosity (cP) | Water Content (ppm) | | Condition | Retention Rate (%) | Condition | Generation Amount (cc) |
| Example 1 | 4000 | 300 | 2000 | 300 | 80 | 1 | 94 | 1 | 20 |
| Example 2 | 5000 | 200 | 2500 | 200 | 60 | 1 | 97 | 1 | 17 |
| Example 3 | 4500 | 300 | 1500 | 300 | 80 | 2 | 95 | 2 | 10 |
| Comparative Example 1 | 12000 | 300 | 3500 | 950 | 4000 | 1 | 88 | 1 | 32 |
| Comparative Example 2 | 4000 | 2000 | 2000 | 900 | 300 | 1 | 84 | 1 | 40 |
| Comparative Example 3 | 8000 | 900 | 3000 | 1200 | 280 | 1 | 82 | 1 | 38 |
| Comparative Example 4 | 9000 | 300 | 2000 | 300 | 50000 | 1 | 32 | 1 | 87 |
| Comparative Example 5 | 10000 | 800 | 7000 | 600 | 200 | 1 | 43 | 1 | 42 |
| Comparative Example 6 | 2000 | 400 | — | — | 42000 | 1 | 68 | 1 | 41 |

[Overall Evaluation of Table 1]

It has become clear that, in Examples 1-3, resistance values of the positive electrodes are as low as 100Ω or less, capacity retention rates are as high as 90% or more, and gas generation amounts are as low as 20 cc or less, and, in particular, excellentbattery performance is exhibited. In contrast, in Comparative Examples 1-6, the evaluation criteria is not satisfied, the cycle stability is not sufficient, the gas generation amount is also large, and battery performance is not excellent.

DESCRIPTION OF REFERENCE NUMERALS

1: positive electrode
2: negative electrode
3: separator
5: laminated body
6: nonaqueous electrolyte
7: terminals
8: inclusion body
9: terminal extension part
10: lithium-ion secondary battery
15: positive electrode forming member
16: negative electrode forming member
22: positive electrode current collector
23: positive electrode active material layer
32: negative electrode current collector
33: negative electrode active material layer
71: positive electrode terminal
72: negative electrode terminal

The invention claimed is:

1. A method for producing an electrode for a lithium-ion secondary battery, the method comprising:
mixing at least one electrode active material selected from the group consisting of a positive electrode active material and a negative electrode active material, and a conductive additive and a nonaqueous solvent such that a slurry is obtained; and
diluting or concentrating the slurry and kneading the diluted or concentrated slurry, thereby producing an electrode slurry,
wherein the mixing is performed such that the obtained slurry has a water content of 1000 ppm or less and a viscosity of from 500 cP to 8000 cP, and
wherein the kneading is performed such that a water content of the electrode slurry obtained by the kneading is maintained at a level of the water content of the slurry obtained by the mixing and wherein the positive electrode has a resistance value of 100 ohms or less, a capacity retention rate of 90% or more, and a gas generation amount of 20 cc or less.

2. The method of claim 1, wherein a content of the conductive additive in the electrode slurry with respect to 100 parts by weight of the positive electrode active material or the negative electrode active material is from 1 part by weight to 30 parts by weight.

3. The method of claim 1, wherein the mixing, the diluting or concentrating, and the kneading are performed such that the electrode slurry has a viscosity of from 600 cP to 4000 cP.

4. The method of claim 1, wherein the mixing is performed such that the obtained slurry has the water content of 500 ppm or less.

5. The method of claim 1, wherein a solid content concentration in the electrode slurry is from 30 wt % to 80 wt %.

6. The method of claim 1, wherein, in the mixing and in the diluting or concentrating and/or the kneading, the slurry is stirred under a reduced pressure.

7. The method of claim 6, wherein the reduced pressure is set to have an absolute pressure of 31 kPa or less.

8. The method of claim 1, further comprising:
providing the electrode slurry on a current collector; and
removing the nonaqueous solvent from the electrode slurry such that an active material layer is formed on the current collector.

9. The method of claim 1, wherein, in the mixing, at least one selected from the group consisting of a binder, a dispersing agent, and a thickening agent, is further mixed.

10. The method of claim 1, wherein
the mixing is performed such that the obtained slurry has the viscosity of from 1000 cP to 5000 cP, and
the diluting or concentrating and the kneading are performed such that the electrode slurry has a viscosity of from 600 cP to 4000 cP.

11. The method of claim 1, wherein
the mixing is performed such that the obtained slurry has the viscosity of from 1000 cP to 5000 cP or less, and
the diluting or concentrating and the kneading are performed such that the electrode slurry has a viscosity of from 1000 cP to 4000 cP.

12. The method of claim 1, wherein the positive electrode active material is at least one selected from the group consisting of a lithium manganese oxide, a lithium nickel oxide, a lithium cobalt oxide, a lithium nickel cobalt oxide, a lithium nickel manganese oxide, a spinel type lithium manganese oxide, and a lithium phosphorus oxide.

13. The method of claim 12, wherein the positive electrode active material is a lithium nickel manganese oxide.

14. The method of claim 13, wherein the positive electrode active material is $LiNi_{1/2}Mn_{3/2}O_4$, $LiNi_{1/2}Mn_{1/2}O_2$, or a combination thereof.

15. The method of claim 13, wherein the positive electrode active material is $LiNi_{1/2}Mn_{3/2}O_4$.

* * * * *